United States Patent Office 2,741,631
Patented Apr. 10, 1956

2,741,631

CATALYTIC REACTION OF ACETYLENE WITH VINYLIDENE OR VINYLENE COMPOUNDS

John C. Sauer, Wilmington, Del., assignor to E. I. du Pont de Nemours and Company, Wilmington, Del., a corporation of Delaware No Drawing. Application February 1, 1954, Serial No. 407,606

17 Claims. (Cl. 260—465.3)

This invention relates to a new chemical process and more particularly to a new catalytic process involving acetylene.

When acetylene is reacted with either a vinylidene or vinylene compound in the presence of a complex of a nickel compound with an aryl or alkoxy derivative of an element of sub-group B, group V, in the trivalent state there are obtained heptatrienes, as shown by U. S. Patent 2,540,736. It has now been discovered that by employing a different catalyst, the reaction of acetylene with a vinylidene or vinylene compound produces entirely different products, monoenes being obtained instead of heptatrienes.

It is an object of this invention to provide a new chemical process. A further object is to provide a new catalytic process involving acetylene. A still further object is to provide a process for preparing monoene adducts of acetylene and a vinylidene or vinylene compound. Other objects will appear hereinafter.

These objects are accomplished by the following invention of a process for preparing monoenes by heating and reacting acetylene with a vinylidene or vinylene compound in the presence of a catalyst comprising a complex of an aliphatic diamine with a heavy metal salt of a weak acid, said vinylidene or vinylene compound having the general formula,

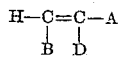

in which A, B, and D are nitrile, acyl, caboalkoxy, alkoxy, and CONR$_1$R$_2$ wherein the R's are hydrogen or lower alkyl groups of 1 to 4 carbons and B and D can be additionally hydrogen, alkyl, or aryl. Monoene adducts of acetylene and vinylidene or vinylene compounds are obtained by the process of this invention.

In practice a pressure reactor is charged with the vinylidene or vinylene compound and catalyst, the reactor is swept with oxygen-free nitrogen, and then pressured with acetylene. The charged reactor is then closed, the reaction mixture is heated to between 50° and 150° C. and the pressure within the reactor maintained within the range 40 to 500 lb./sq. in. by periodic injections of acetylene. After reaction is complete, as evidenced by cessation of pressure drop, the contents of the reactor are permitted to cool to room temperature, and the reactor is opened and discharged. The products are isolated by means well known to those skilled in the art, e. g., distillation, etc.

The examples which follow are submitted to illustrate and not to limit this invention.

EXAMPLE I

A 400 ml. pressure vessel, which had been swept with deoxygenated nitrogen, was charged with 80 g. of acrylonitrile, 3 g' of the ethylenediamine complex of the nickel salt of iron carbonyl dihydride and 0.2 g. of cupric acetate. The reactor was closed, pressure tested with nitrogen, cooled to $-70°$ C., and evacuated. The reactor was connected to a source of acetylene, shaken, and acetylene injected to a gauge pressure of about 100 lb./sq. in. The charge was heated with shaking at 95°–110° C. under acetylene pressure of 200 lb./sq. in. After cessation of pressure drop, the reaction mixture was permitted to cool to room temperature, excess acetylene bled off, and the contents discharged. From a composite of five such runs there were recovered, by distillation, 90 g. of acrylonitrile and the materials listed in the table below:

| Cut | B. P. Range | Wgt./g. | $n_D^{25}$ |
|---|---|---|---|
| A | 90–96.5 | 5 | 1.3687 |
| B | 96.5–98 | 4 | 1.3654 |
| C | 40.5–75.0/70 mm | 4 | 1.4027 |
| D | 75–76/70 mm | 43 | [1] 1.4176 |
| E | 110/70–125.5/5 mm | 6 | |
| F | 125.5–127/5 mm | 4 | 1.4496 |
| G | 118–124/5 mm | 3.5 | 1.4553 |
| H | 124–145/5 mm | 4 | |
| I | 145–7/5 mm | 4 | [2] 1.4752 |

[1] 4-Pentenenitrile.
[2] Precursor of suberonitrile.

Cut D was 4-pentenenitrile, identified by elemental and spectral data and comparison with an authentic sample. The analytical data are summarized below:

| | 4-Pentenenitrile from Acetylene and Acrylonitrile | Authentic Sample |
|---|---|---|
| Boiling Point, ° C | 75°/75 mm | 142–3°/749 mm. |
| $n_D^{25}$ | 1.4153 | 1.4150. |
| C; H; N | 74.3, 74.2; 8.8, 8.5; 12.3 | 74.2; 8.7; 17.3 (calc'd) |
| H$_2$No | 0.0262 g. H$_2$/g. sample | 0.0249 g. H$_2$/g. sample (calculated). |
| Infrared | Same as authentic sample | |

A 2 g. sample of the 4-pentenenitrile was hydrogenated at room temperature over a palladium-on-charcoal catalyst to valeronitrile. This nitrile was converted into the known alpha-iminomercapto acetic acid hydrochloride which melted at 137–80° C. [reported value of this derivative is 137–8° C.; see Shriner, J. Am. Chem. Soc. 59, 230 (1937)].

Cut I, based on elemental analyses, was a reaction product consisting of two moles of acrylonitrile with one mole of acetylene and one mole of hydrogen. This product, after the absorption of one mole of hydrogen, gave suberic acid upon hydrolysis. The chemistry for this series of reactions is indicated below:

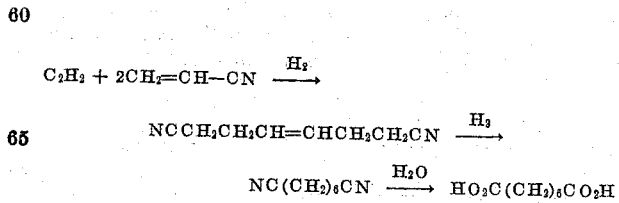

The suberic acid was further characterized by taking a mixed melting point with an authentic sample which showed no depression and by the infrared spectrum, which was identical with the spectrum of an authentic sample.

Analysis:
Calc'd for $C_8H_{10}N_2$

($NCCH_2CH_2CH=CHCH_2CH_2CN$)

C, 71.60; H, 7.50; N, 20.90; $H_2$ No. 0.0151
Found:
C, 71.74; N, 7.38; N, 20.90; $H_2$ No. 0.0151
71.48      7.48      21.03

Suberic acid is useful as an intermediate for polyamides and polyesters.

The catalyst used in the above Example was prepared as follows:

To 220 ml. of 6 N potassium hydroxide there was added 40 ml. of iron pentacarbonyl ($Fe(CO)_5$) and the mixture agitated at room temperature for 6 hours. The clear solution was then placed in a flask fitted with a nitrogen inlet, stirrer, and separating funnel. A solution of 78 g. of $NiCl_2.6H_2O$ and 60 g. of ethylenediamine in about 250 ml. of water was added under nitrogen. The mixture was filtered under nitrogen, and washed with water, methanol, and ether. The product was a pink powder.

EXAMPLE II

Example I was repeated except that methyl acrylate was used in place of acrylonitrile. From a composite of four runs, involving 455 g. of methyl acrylate, there were obtained 213.1 g. of recovered methyl acrylate and 131 g. of higher boiling esters, from which an 8% yield of methyl 4-pentenoate contaminated with a small amount of cyclooctatetraene was obtained. There was also isolated methyl tetrahydrobenzoate in 3.5% yield.

The methyl 4-penteneoate was characterized by elemental and spectral analyses, hydrogen number, saponification number, and comparison with an authentic sample. These data are summarized in the table below:

|  | Methyl 4-Penteneoate from Acetylene and Methyl Acrylate | Authentic Sample |
|---|---|---|
| Boiling Point, °C | 127–127.5 (64–7/80 mm.) | 126–7. |
| $n_D^{25}$ | 1.4200 | 1.4130. |
| $H_2$ No | 0.212* | 0.0175 (calc'd). |
| C; H anal | 64.7; 8.0* | 63.2; 8.8 (calc'd). |
| Sapon. No | 461.2 | 491 (calc'd.). |
| Infrared data | Same as authentic sample and contains some cyclooctatetraene bands in addition. |  |

* Not all cyclooctatetraene was removed by distillation.

Hydrogenation of methyl 4-pentenoate gave methyl n-valerate distilling at 125°–125.7° C., $n_D^{25}$, 1.3957. The methyl n-valerate structure was confirmed by infrared analysis.

The methyl tetrahydrobenzoate fraction distilled at 48°–52° C./2 mm., $n_D^{25}$, 1.4893, and the infrared spectrum indicated the presence of internal unsaturation. Hydrogenation of the ester yielded methyl hexahydrobenzoate, whose infrared spectrum was identical to the spectrum of an authentic sample.

Analysis:
Calc'd for $C_8H_{10}O_2$: C, 69.70; H, 7.30; Sap. No. 406.0; $H_2$ No. 0.028
Found: C, 70.49; H, 7.60; Sap. No. 394.6; $H_2$ No. 0.024

The hydrogenated ester (methyl hexahydrobenzoate) distilled at 75°–77° C./17 mm. $n_D^{25}$, 1.4400. The authentic sample of methyl hexahydrobenzoate was prepared by hydrogenating methyl benzoate, B. P. 82° C./25 mm., $n_D^{25}$, 1.4419.

EXAMPLE III

One hundred ml. of methyl acrylate, 5 g. of the ethylenediamine complex of the nickel salt of iron carbonyl dihydride, 0.5 g. of cupric acetate, and 10 g. of cyclohexene were charged into a shaker tube. The run was carried out under acetylene pressure of 220–250 lb./sq. in. at a temperature of 105°–112° C. for 8 hours. Upon distillation of the reaction product, there were obtained crude methyl 4-pentenoate (B. P. 33–40° C./20 mm.) in 36% yield and a heart-cut ester distilling at 35.6° C./20 mm. in 9.5% yield, along with higher boiling esters which were not characterized.

EXAMPLE IV

One hundred ml. of acrylonitrile, 4 g. of the ethylenediamine complex of the nickel salt of iron carbonyl dihydride, 0.4 g. of cupric acetate, and 15 g. of tetralin were charged into a pressure vessel. Acetylene was injected to a pressure of 210–265 lb./sq. in. at a temperature of 100°–107° C. and these conditions maintained for 8.7 hours. There was obtained 4-pentenenitrile in 8% yield and higher boiling nitriles which were not characterized.

EXAMPLE V

One hundred ml. of acrylonitrile and 4 g. of the ethylenediamine complex of nickel carbonate were charged into a pressure vessel and the charge heated to 100° C. under 180–190 lb./sq. in. acetylene pressure. These conditions were maintained for 8.5 hours. Distillation of the reaction product yielded 3.5 g. of 4-pentenenitrile, B. P. 52–60° C./25 mm., $n_D^{25}$, 1.4174 and higher boiling nitriles which were not characterized.

EXAMPLE VI

A shaker tube was charged with 100 ml. of acrylonitrile, 2.15 g. of N,N,N′,N′-tetramethyl tetramethylenediamine ($Me_2N(CH_2)_4NMe_2$), and 0.55 g. of anhydrous nickel cyanide. The reaction mixture was heated to 80°–90° C. under an acetylene pressure of 240–280 lb./sq. in. These conditions were maintained for 5.8 hours. There was obtained 3.3 g. of crude 4-pentenenitrile, which was characterized by its infrared absorption spectrum.

EXAMPLE VII

One hundred ml. of acrylonitrile, 2 g. of the ethylenediamine complex of the nickel salt of iron carbonyl dihydride, and 0.5 g. of nickel acetate were charged into a pressure reactor and the charge heated to 100°–110° C. for 8 hours under an acetylene pressure of 180–240 lb./sq. in. There was obtained 9.5 g. of a material identified as 4-pentenenitrile by infrared spectra. From the reaction product, there was also recovered 23.1 g. of acrylonitrile. The yield of 4-pentenenitrile, based on the acrylonitrile consumed, was 11.3%.

EXAMPLE VIII

One hundred ml. of acrylonitrile and 3 g. of the ethylenediamine complex of the nickel salt of iron carbonyl dihydride was charged into a pressure reactor and the charge heated to 105°–110° C. for 5.3 hours under 200–230 lb./sq. in. of acetylene pressure. From the reaction mixture there was obtained 2 g. of 4-pentenenitrile, characterized by its infrared spectrum.

EXAMPLE IX

A pressure vessel was charged with 100 ml. of acrylonitrile and a preformed catalyst made by adding 2.7 g. of ethylenediamine to 1.7 g. of nickel cyanide. The reaction mixture was heated to 87°–100° C. for 5.8 hours under an acetylene pressure of 265–270 lb./sq. in. There was obtained 0.6 g. of 4-pentenenitrile, characterized by its infrared spectrum.

EXAMPLE X

A pressure vessel was charged with 100 ml. of acrylonitrile, 2 g. of anhydrous nickel acetate and 2 g. of ethylenediamine and the charge heated to 100°–120° C. for 6.1 hours under an acetylene pressure of 220–265 lb./sq. in. From the reaction mixture there was obtained 5.0 g. of 4-pentenenitrile, characterized by its infrared spectrum.

EXAMPLE XI

A pressure vessel was charged with 100 ml. of acrylonitrile, 1.8 g. of nickel carbonate and 3.4 g. of propylenediamine-1,3, and the charge heated at 105°–115° C. for 5.8 hours under an acetylene pressure of 150–180 lb./sq. in. There was recovered 41.2 g. of acrylonitrile and from the residue there was obtained 4 g. of distillate, B. P. 20–150° C./2 mm. which contained 4-pentenenitrile, as indicated by its infrared spectrum.

EXAMPLE XII

In each of two runs there was charged into a pressure vessel 150 ml. of methacrylonitrile, 3 g. of the ethylenediamine complex of the nickel salt of iron carbonyl dihydride and 0.4 g. of nickel acetate. The charge was heated in one case at 105°–110° C. for 3.4 hours under an acetylene pressure of 180–190 lb./sq. in. and in the other at 112°–115° C. for 6 hours under an acetylene pressure of 170–205 lb./sq. in. The two runs were composited and there was obtained 2.5 g. of a product, B. P. 75–80/78 mm., $n_D^{25}$, 1.4657, which contained approximately 50% of the expected alpha-methyl-4-pentenenitrile and about 50% of aromatic hydrocarbon.

The characterization of the pentenenitrile derivative was based primarily on the infrared spectrum, which indicated the presence of a nitrile group, a terminal vinyl group and a methyl group. Elemental analyses indicated that the product was a mixture of the pentenitrile and aromatic hydrocarbon, which was consistent with the data obtained by infrared.

Analysis:
   Calc'd for $C_6H_9N$:   C, 75.80; H, 9.50; N, 14.7
   Found:                   C, 80.01; H, 7.96; N, 7.47
                              79.59      7.94      7.46
                              80.22      7.88

EXAMPLE XIII

Fifty g. of acrylonitrile, 100 g. of dioxane, 3 g. of the ethylenediamine complex of the nickel salt of iron carbonyl dihydride and 0.2 g. of nickel acetate was charged into a pressure vessel. The reaction was carried out at 112°–115° C. for 4.5 hours at an acetylene pressure of 190–200 lb./sq. in. From the reaction mixture there was recovered 55 g. of an acrylonitrile/dioxane mixture and 28.9 g. of dioxane. There was also obtained 4.3 g. of 4-pentenenitrile, as determined by its infrared spectrum.

Pressure is not a critical variable and the process may be operated at atmospheric pressure or at pressures which may be above or below atmospheric. For convenience and simplicity of equipment requirements, pressures in the range of 40 to 500 lb./sq. in. are employed and it is preferred to operate at pressures of from 50 to 300 lb./sq. in.

The time of reaction varies with the particular reactants involved in the reaction, the temperature employed, the amount and type of catalyst used, etc. As a rule the reaction is taken to be complete when there is no further observed pressure drop.

The temperature employed may vary from 50° to 150° C. The best yields of desired products, together with the best reaction rates are attained in the range of 70° to 125° C. and this therefore embraces the temperature conditions generally used.

The nature of the products obtained requires that one mole of hydrogen participate in the reactions and yet hydrogen is not among the reactants charged into the reactor. The source of this hydrogen is not precisely known but it is reasonable to believe that it is the result of a hydrogen-exchange mechanism, probably involving disproportionation of acetylene.

The process of this invention yields two series of products. One series is formed from reaction of acetylene, hydrogen, and vinylene or vinylidene compound in 1:1:1 mole ratio and the other in 1:1:2 mole ratio.

The vinylene and vinylidene compounds used in the practice of this invention are those which conform to the general formula

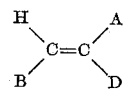

where A, B, and D are nitrile, acyl, alkoxy, carboalkoxy, and $CONR_1R_2$ in which the R's are hydrogen or lower alkyl groups of 1 to 4 carbon atoms, and B and D can be additionally hydrogen, alkyl, or aryl radicals. Preferred carboalkoxy, acyl, alkyl and aryl radicals are those containing up to 13 carbon atoms, and most preferably those containing up to 10 carbon atoms. Examples of such compounds are acrylonitrile, acrylic and methacrylic acid esters, e. g., methyl, ethyl and decyl acrylates, etc., acrylamide, methyl vinyl ketone, acrolein, methacrolein, crotonaldehyde, cinnamic acid esters, e. g., methyl and ethyl cinnamates, etc., methyl-alpha-phenyl-acrylates, maleonitrile, maleic and fumaric esters, e. g., butyl and octyl maleates and fumarates, etc., fumaramide, etc. The most preferred vinylidene and vinylene compounds are the acrylic and methacrylic compounds, e. g., the nitriles, esters, and amides.

The 1:1 adducts of acetylene with a vinylidene or vinylene compound of the above general formula correspond in structure to

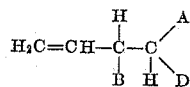

wherein A, B, and D are defined as aforesaid.

The adducts of 1 mole of acetylene with 2 moles of the vinylidene or vinylene compound correspond to the general formula

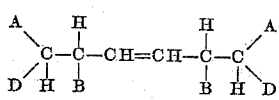

wherein A, B, and D are defined as aforesaid.

Further specific examples of vinylidene or vinylene compounds which can be substituted for acrylonitrile in Example I are those listed in the left column of the table below to obtain the products listed in the right column.

Table

| Vinylidene or Vinylene Compound | Mole Ratio—Acetylene, Vinylidene or Vinylene Compound | Product |
|---|---|---|
| $CH_2=CH-COOC_{12}H_{25}$ | 1:1 | $CH_2=CH-CH_2CH_2-COOC_{12}H_{25}$ |
| $CH_2=CH-COOC_{12}H_{25}$ | 1:2 | $C_{12}H_{25}OCO(CH_2)_2CH=CH(CH_2)_2COOC_{12}H_{25}$ |
| $CH_2=CH-CONH_2$ | 1:1 | $CH_2=CH-CH_2CH_2-CONH_2$ |
| $CH_2=CH-CONH_2$ | 1:2 | $NH_2CO(CH_2)_2CH=CH(CH_2)_2CONH_2$ |
| $CH_2=CH-CON(CH_3)_2$ | 1:1 | $CH_2=CH-CH_2CH_2-CON(CH_3)_2$ |
| $CH_2=CH-CON(CH_3)_2$ | 1:2 | $(CH_3)_2NCO(CH_2)_2CH=CH(CH_2)_2CON(CH_3)_2$ |
| $CH_2=CH-COCH_3$ | 1:1 | $CH_2=CH-CH_2CH_2-COCH_3$ |
| $CH_2=CH-COCH_3$ | 1:2 | $CH_3CO(CH_2)_2CH=CH(CH_2)_2COCH_3$ |
| $CH_3CH=CH-CN$ | 1:1 | $CH_2=CH-\underset{\underset{CH_3}{\vert}}{CH}-CH_2CN$ |
| $CH_3CH=CH-CN$ | 1:2 | $NC\underset{\underset{CH_3}{\vert}}{CH_2CH}CH=CH\underset{\underset{CH_3}{\vert}}{CH}CH_2CN$ |
| $\phi CH=CH-COOCH_3$ | 1:1 | $CH_2=CH-\underset{\underset{\phi}{\vert}}{CH}-CH_2-COOCH_3$ |
| $\phi CH=CH-COOCH_3$ | 1:2 | $CH_3OCOCH_2\underset{\underset{\phi}{\vert}}{CH}CH=CH\underset{\underset{\phi}{\vert}}{CH}CH_2COOCH_3$ |
| $NCCH=CHCN$ | 1:1 | $CH_2=CH-\underset{\underset{CN}{\vert}}{CH}-CH_2CN$ |
| $NCCH=CHCN$ | 1:2 | $NC\underset{\underset{CN}{\vert}}{CH_2CH}CH=CH\underset{\underset{CN}{\vert}}{CH}CH_2CN$ |
| $CH_2=CH-CHO$ | 1:1 | $CH_2=CH-CH_2-CH_2-CHO$ |
| $CH_2=CH-CHO$ | 1:2 | $OCHCH_2CH_2CH=CHCH_2CH_2CHO$ |
| $CH_2=\underset{\underset{CH_3}{\vert}}{C}-CHO$ | 1:1 | $CH_2=CH-CH_2-\underset{\underset{CH_3}{\vert}}{CH}-CHO$ |
| $CH_2=\underset{\underset{CH_3}{\vert}}{C}-CHO$ | 1:2 | $OCHCH_2\underset{\underset{CH_3}{\vert}}{CH}CH=CH\underset{\underset{CH_3}{\vert}}{CH}CH_2CHO$ |
| $CH_2=CH-O-CH_3$ | 1:1 | $CH_2=CH-CH_2-CH_2-O-CH_3$ |
| $CH_2=CH-O-CH_3$ | 1:2 | $H_3C-O-CH_2-CH_2-CH=CH-CH_2-CH_2-O-CH_3$ |

The catalysts used in the practice of this invention are complexes of primary, secondary, and tertiary aliphatic diamines with salts of weak acids. By a "weak acid" is meant an acid which has a primary dissociation constant at 25° C. of $1 \times 10^{-3}$ or less. Specific acids of this type besides iron carbonyl dihydride are rhenium pentacarbonyl hydride, osmium tetracarbonyl dihydride, cobalt tetracarbonyl hydride, rhodium tetracarbonyl hydride, iridium tetracarbonyl hydride, manganese carbonyl hydride, hydrocyanic acid, and such acids as acetic, arsenic, benzoic, chloroacetic, chloropropionic, fumaric, phthalic, isocrotonic, carbonic, and the like.

The metal carbonyl hydrides, for example, iron and cobalt carbonyl hydrides are formed when certain carbonyls, such as, $Fe(CO)_5$ and $[Co(CO)_4-]_2$ are absorbed in strongly alkaline solutions, such as KOH and $Ba(OH)_2$. They are liberated when acid is added [W. Hieber and F. Leutert, Natuwissenschaften 19, 360 (1931); Z. anorg. Allgem. Chem. 204, 145 (1932); W. Hiebert and H. Schulten, Z. anorg. Allgem. Chem. 232, 29 (1937)].

The salts of the acids which constitute one element in the catalysts used in the process of this invention are those of the heavy metals, i. e., a metal having a density above four. Especially useful are the nickel, cobalt, copper, and the like.

The diamine component of the catalyst may be any primary, secondary, or tertiary aliphatic diamine. Specific examples are ethylenediamine, 1,3-diaminopropane, 1,4-diaminobutane, 1,6-diaminohexane, 1-methylamino-6-aminohexane, 1-isobutylamino-8-aminooctane, N,N,N',N'-tetraethyltetramethylenediamine, and the like. These diamines have aliphatic carbon between the amino groups, such as alkylene chain of two to eight carbon atoms.

The most preferred catalysts are the complexes of ethylenediamine with the nickel or copper salt of iron carbonyl dihydride. Other preferred catalysts are the complexes of ethylenediamine with such nickel and copper salts as copper acetate, copper cyanide, copper carbonate, nickel acetate, nickel cyanide, and the like.

The catalyst is employed in a catalytic amount of at least 0.001 mole of the complex of the diamine with the heavy metal salt of the weak acid per mole of the vinylene or vinylidene compound. The complex may be performed and added as such in catalytic amounts to the reaction mixture or it may be made in situ by adding the diamine and the nickel salt of the weak acid to the reaction mixture.

As illustrated in Examples I to IV, VII and XI to XIII there may be added to the aliphatic diamine-heavy metal salt of a weak acid complex a minor amount of a nickel or copper salt of a weak acid.

The process of this invention makes it possible to convert acetylene to monoenes. Such monoenes are useful as chemical intermediates. Thus, 4-pentenenitrile is readily converted to methyl 4-pentenoate, as illustrated in Example I. The methyl 4-pentenoate by reaction with carbon monoxide yields adipic acid, as shown below:

A pressure reactor was charged with 28 g. of methanol, 38 g. of methyl 4-pentenoate, prepared as in Example I, and 5 g. of a reduced, unsintered, cobalt catalyst. The charged reactor was then pressured to 450 atmospheres with carbon monoxide and heated at 238° to 242° C. for 9.5 hours. The reactor was thereafter discharged and the contents filtered to remove the catalyst. The filtrate was distilled and the dibasic acid fraction hydrolyzed. There was obtained adipic acid in approximately 9% conversion.

The adipic acid obtained as described above is useful as an intermediate for polyamides, polyesters, and other products.

The difunctional monoenes obtained from one mole of acetylene and two moles of vinylidene or vinylene compound are useful as intermediates for plastics, etc.

As many apparently widely different embodiments of this invention may be made without departing from the spirit and scope thereof, it is to be understood that this invention is not limited to the specific embodiments thereof except as defined in the appended claims.

I claim:

1. Process for preparing monoenes which comprises heating and reacting acetylene with a compound selected from the class consisting of vinylidene and vinylene compounds in the presence of a catalyst comprising a complex of an aliphatic diamine with a heavy metal salt of a weak acid, said vinylidene and vinylene compounds having the general formula

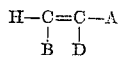

in which A and B are selected from the class consisting of hydrogen, alkyl, aryl, nitrile, acyl, carboalkoxy, alkoxy, and $CONR_1R_2$ wherein the R's are from the group consisting of hydrogen and lower alkyl groups of 1 to 4 carbon atoms, and D is selected from the class consisting of nitrile, acyl, carboalkoxy, alkoxy and $CONR_1R_2$ wherein the R's are from the group consisting of hydrogen and lower alkyl groups of 1 to 4 carbon atoms, and isolating from the reaction mixture the resulting monoene adduct.

2. Process for preparing monoenes as set forth in claim 1 wherein said catalyst comprises a complex of an aliphatic diamine with a nickel salt of a weak acid.

3. Process for preparing monoenes as set forth in claim 1 wherein said catalyst comprises a complex of ethylene-diamine with a nickel salt of a weak acid.

4. Process for preparing monoenes as set forth in claim 1 wherein said catalyst comprises a complex of ethylene-diamine with the nickel salt of iron carbonyl dihydride.

5. Process for preparing monoenes as set forth in claim 1 wherein said catalyst comprises a complex of ethylene-diamine with nickel acetate.

6. Process for preparing monoenes as set forth in claim 1 wherein said catalyst comprises a complex of ethylene-diamine with nickel cyanide.

7. Process for preparing monoenes which comprises heating and reacting acetylene at a temperature within the range of 50 to 150° C. and under a pressure within the range of 40 to 500 lbs./sq. in. with a compound selected from the class consisting of vinylidene and vinylene compounds in the presence of a catalyst comprising a complex of an aliphatic diamine with a heavy metal salt of a weak acid, said vinylidene and vinylene compounds having the general formula

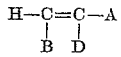

in which A and B are selected from the class consisting of hydrogen, alkyl, aryl, nitrile, acyl, carboalkoxy, alkoxy and $CONR_1R_2$ wherein the R's are from the group consisting of hydrogen and lower alkyl groups of 1 to 4 carbon atoms, and D is selected from the class consisting of nitrile, acyl, carboalkoxy, alkoxy and $CONR_1R_2$ wherein the R's are from the group consisting of hydrogen and lower alkyl groups of 1 to 4 carbon atoms, and isolating from the reaction mixture the resulting monoene adduct.

8. Process for preparing monoenes as set forth in claim 7 wherein acetylene is heated and reacted with said compound selected from the class consisting of vinylidene and vinylene compounds at a temperature within the range of 70 to 125° C. and under a pressure within the range of 50 to 300 lbs./sq. in.

9. Process for preparing monoenes which comprises heating and reacting acetylene at a temperature within the range of 50 to 150° C. and under a pressure within the range of 40 to 500 lbs./sq. in. with acrylonitrile in the presence of a catalyst comprising a complex of an aliphatic diamine with a nickel salt of a weak acid, and isolating from the reaction mixture the resulting monoene adduct.

10. Process for preparing monoenes as set forth in claim 9 wherein said catalyst comprises a complex of ethylene-diamine with the nickel salt of iron carbonyl dihydride.

11. Process for preparing monoenes as set forth in claim 9 wherein said catalyst comprises a complex of ethylene-diamine with nickel acetate.

12. Process for preparing monoenes as set forth in claim 9 wherein said catalyst comprises a complex of ethylene-diamine with nickel cyanide.

13. Process for preparing monoenes which comprises heating and reacting acetylene at a temperature within the range of 50 to 150° C. and under a pressure within the range of 40 to 500 lbs./sq. in. with methacrylonitrile in the presence of a catalyst comprising a complex of an aliphatic diamine with a nickel salt of a weak acid, and isolating from the reaction mixture the resulting monoene adduct.

14. Process for preparing monoenes as set forth in claim 13 wherein said catalyst comprises a complex of ethylenediamine with the nickel salt of iron carbonyl dihydride.

15. Process for preparing monoenes which comprises heating and reacting acetylene at a temperature within the range of 50 to 150° C. and under a pressure within the range of 40 to 500 lbs./sq. in. with an acrylic ester in the presence of a catalyst comprising a complex of an aliphatic diamine with a nickel salt of a weak acid, and isolating from the reaction mixture the resulting monoene adduct.

16. Process for preparing monoenes which comprises heating and reacting acetylene at a temperature within the range of 50 to 150° C. and under a pressure within the range of 40 to 500 lbs./sq. in. with methyl acrylate in the presence of a catalyst comprising a complex of an aliphatic diamine with a nickel salt of a weak acid, and isolating from the reaction mixture the resulting monoene adduct.

17. Process for preparing monoenes as set forth in claim 16 wherein said catalyst comprises a complex of ethylenediamine with the nickel salt of iron carbonyl dihydride.

References Cited in the file of this patent

UNITED STATES PATENTS 2,540,736   Kalb et al. _____ Feb. 6, 1951